United States Patent
Futamura et al.

(10) Patent No.: US 6,565,474 B2
(45) Date of Patent: May 20, 2003

(54) HYDRAULIC PRESSURE CONTROL DEVICE FOR AN AUTOMATIC TRANSMISSION

(75) Inventors: Suguru Futamura, Toyokawa (JP); Noriyoshi Kondoh, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 76 days.

(21) Appl. No.: 09/820,810

(22) Filed: Mar. 30, 2001

(65) Prior Publication Data

US 2002/0002093 A1 Jan. 3, 2002

(30) Foreign Application Priority Data

Mar. 31, 2000 (JP) .......................................... 2000-097760

(51) Int. Cl.$^7$ .............................................. F16H 31/00
(52) U.S. Cl. ...................................... 475/128; 475/116
(58) Field of Search ................................. 475/127, 128, 475/116

(56) References Cited

U.S. PATENT DOCUMENTS 3,618,424 A  * 11/1971  Golan et al. ................. 475/128
5,605,516 A  * 2/1997  Tsukamoto et al. ......... 475/128

FOREIGN PATENT DOCUMENTS

JP           5-296320          11/1993

* cited by examiner

*Primary Examiner*—Jack Lavinder
*Assistant Examiner*—Thomas J. Williams
(74) *Attorney, Agent, or Firm*—Burns, Doane, Swecker & Mathis, LLP

(57) ABSTRACT

A hydraulic pressure control device for an automatic transmission in which a single control valve selectively applies control pressure to friction elements includes a control valve and a shift valve. The control valve has a control port from which control pressure is outputted after being adjusted by a linear solenoid valve, and first and second feedback ports to which the control pressure is fed back. The shift valve is positionable in a first position when the control pressure is applied to the first friction element and a second position when the control pressure is applied to the second friction element, and is adapted to lower the control pressure outputted by the control valve in the second position of the shift valve by controlling communication of the control port with the feedback ports. In addition, an ON-OFF solenoid valve switches the position of the shift valve.

15 Claims, 3 Drawing Sheets

HYDRAULIC PRESSURE CONTROL DEVICE FOR AN AUTOMATIC TRANSMISSION

This application is based on and claims priority under 35 U.S.C. §119 with respect to Japanese Application No. 2000-097760 filed on Mar. 31, 2000, the entire content of which is incorporated herein by reference.

FIELD OF THE INVENTION

The present invention is generally related to automatic transmissions. More particularly, the present invention pertains to a hydraulic pressure control device which produces various gear stages of an automatic transmission.

BACKGROUND OF THE INVENTION

A hydraulic pressure control device for an automatic transmission is designed to control the hydraulic pressure fed to a plurality of friction elements. This involves the use of a linear solenoid valve which adjusts the hydraulic pressure outputted from an oil pump, a control valve receiving the outputted hydraulic pressure for generating the control pressure which is to be applied to each of the friction elements, and a shift valve whose position is adapted to be switched to make it possible to apply the control pressure to one or more of the desired friction elements.

In some gear train arrangements, differences may exist with respect to the control pressure required to effect engagement. With the arrangement mentioned above, the switching of the shift valve causes the control pressure outputted from the single control valve to be applied to the required plural friction elements. This means that even if the friction elements to be applied with the control pressure change, the magnitude of the control pressure remains unchanged. That is, although various ones of the friction elements may require different control pressures (i.e., a different magnitude of control pressure) for effecting engagement of the friction elements, the magnitude of the control pressure outputted from the single control valve is the same. Thus, with a construction such as that described above, by controlling the linear solenoid valve and the control valve, the magnitude of the control pressure outputted from the single control valve corresponds to the greatest magnitude of hydraulic pressure required for engaging the friction elements.

However, in this type of arrangement, although a control pressure having adequate magnitude may be applied to one or more of the friction elements, an excessively high control pressure is applied to various other ones of the friction elements. Thus, the balance in the hydraulic pressure to be applied to the friction elements becomes worse, which lowers the hydraulic control performance, whereby undesirable shift shock may occur and/or an adverse affect may occur in the lower area of engine idling.

Thus, a need exists for improved shift control performance in a hydraulic control device for an automatic transmission.

It would thus be desirable to improve the shift control performance in an automatic transmission hydraulic control device in which control pressure is applied from a single control valve to a plurality of friction elements.

SUMMARY OF THE INVENTION

According to one aspect of the invention, a hydraulic pressure control device for an automatic transmission, in which control pressure is applied to and drained from each of a plurality of friction elements to produce various gear stages, includes an adjusting mechanism for adjusting hydraulic pressure from an oil pump to produce an outputted hydraulic pressure, and a control valve receiving the outputted hydraulic pressure from the adjusting mechanism for generating the control pressure to be applied to at least some of the friction elements whose magnitude depends on a magnitude of the outputted hydraulic pressure. The control valve includes a control port from which the control pressure is outputted, a first feed back port to which the outputted control pressure is adapted to be fed back, and a second feed back port to which the outputted control pressure is adapted to be fed back. A shift valve receives the control pressure from the control valve and is selectively positionable in a first position for applying hydraulic pressure to the first friction element and a second position for applying hydraulic pressure to the second friction element. The shift valve is operated in such a manner that fluid communication between the control port and each of the first and the second feedback ports is controlled to lower the control pressure from the control valve when the shift valve is in the second position relative to the control pressure from the control valve when the shift valve is in the first position. A switching device is provided for switching the shift valve between the first position and the second position.

In accordance with the present invention, the first feedback port and the second feedback port are provided in the control valve, and fluid communication between the control port and the first and second feedback ports is communicated or interrupted by the shift valve. Thus, the control pressure when outputted from the control valve for being applied to the first friction element differs from the control pressure outputted from the control valve for being applied to the second friction element.

Thus, even if the friction elements are applied with control pressure from a single control valve, the magnitude of the control pressure applied to each friction element can be adequate and generally consistent with the required pressure, thus improving the hydraulic pressure control performance upon gear stage change. This thus improves the shift control performance by, for example, reducing the shift shock and/or lessening any adverse effect of engine idling when the gear stage is changed.

In accordance with another aspect of the invention, a hydraulic pressure control device for an automatic transmission in which control pressure is applied to and drained from a plurality of friction elements to produce various gear stages includes a linear solenoid valve connected to a pump to adjust hydraulic pressure from the pump and produce an outputted hydraulic pressure, and a control valve fluidly connected to the linear solenoid valve to receive the outputted hydraulic pressure from the linear solenoid valve and generate the control pressure to be applied to at least a first one of the friction elements and a second one of the friction elements. The control valve has a control port from which the control pressure is outputted, a first feed back port receiving control pressure and a second feed back port receiving control pressure. A shift valve is fluidly connected to the control valve to receive the control pressure from the control valve, with the shift valve including a movable valve main body, a first shift port connected to the first friction element, a second shift port connected to the second friction element, and a control pressure adjusting port connected to the second feed back port of the control valve. An ON-OFF solenoid valve is connected to the shift valve to move the valve main body between a first position in which the hydraulic pressure is applied to the first friction element and is prevented from being applied to the second friction element and the control pressure is supplied to the first feed back port of the control valve while being prevented from being supplied to the second fee back port of the control valve, and a second position in which the hydraulic pressure is applied to the second friction element and is prevented from being applied to the first friction element and the control pressure is supplied to the second feed back control port of the control valve by way of the control pressure adjusting port and to the first feed back port of the control valve.

According to another aspect of the invention, a method of controlling hydraulic pressure in an automatic transmission in which control pressure is applied to and drained from each of a plurality of friction elements to produce various gear stages involves producing one gear stage by supplying control pressure from a control valve to a first one of the friction elements by way of a shift valve while preventing control pressure from being supplied to a second one of the friction elements by way of the shift valve, and producing a different gear stage by supplying control pressure from the control valve to the second friction element by way of the shift valve while preventing control pressure from being supplied to the first friction element by way of the shift valve. The control pressure supplied to the second friction element during the different gear stage is less than the control pressure supplied to the first friction element during the one gear stage.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
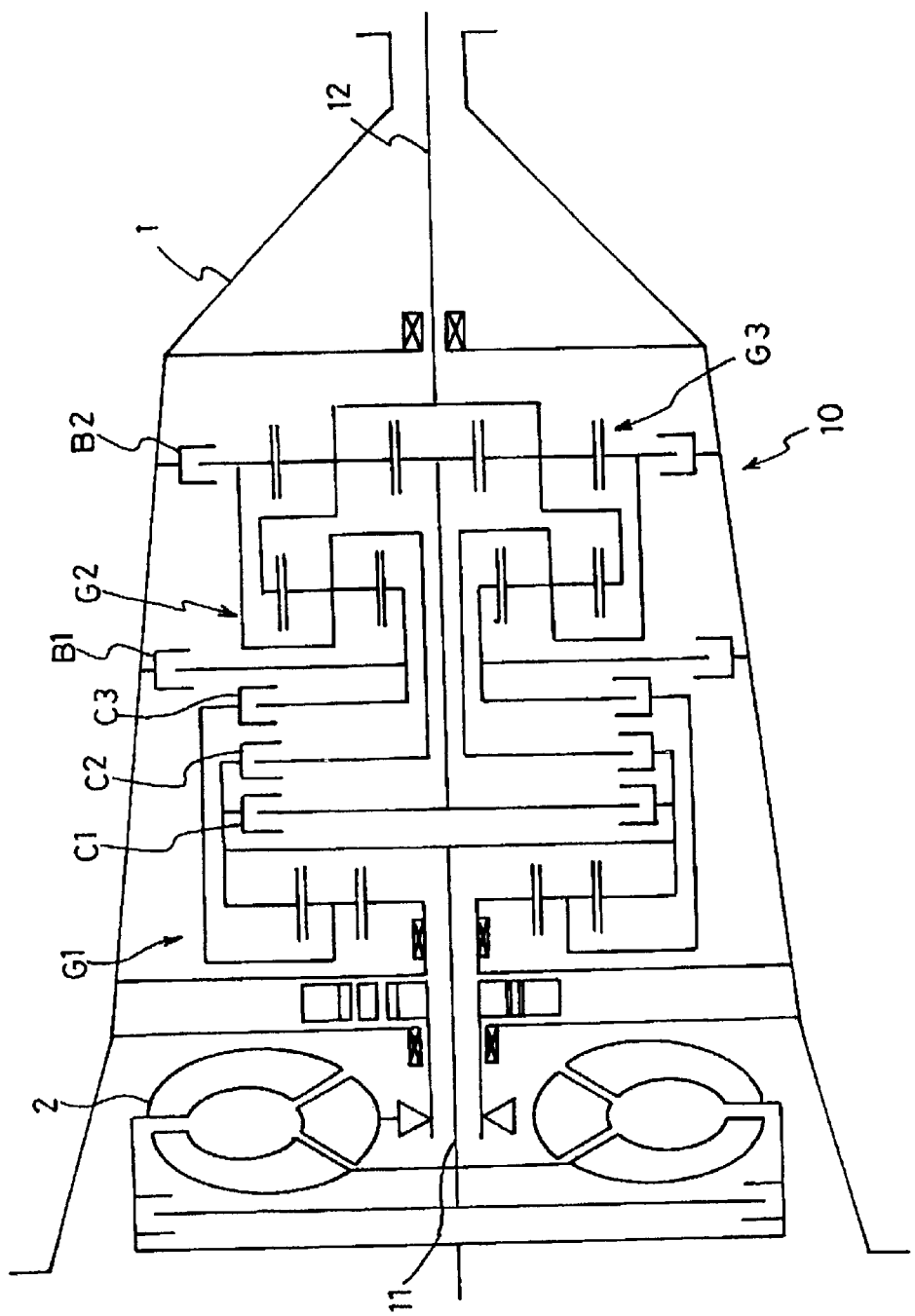
FIG. 1 is a schematic illustration of an automatic transmission with which is associated a hydraulic pressure control device in accordance with the present invention.

FIG. 1 illustrates an automatic transmission 10 with which the hydraulic control device of the present invention can be used. Generally speaking, the automatic transmission 10 has five hydraulically-actuated friction elements B1, B2, C1, C2, C3 to establish six gear stages. The gear stage of the automatic transmission 10 is changed by operating the hydraulic control device 300 to switch the friction element (s) to which is applied the hydraulic pressure.

As can be seen from FIG. 1, in addition to the aforementioned five hydraulically-actuated friction elements B1, B2, C1, C2, C3, the automatic transmission 10 includes an input shaft 11 constituting the output shaft of a torque converter 2, an output shaft 12 connected to each of the wheel axles by way of a differential, a first single pinion planetary gear unit G1 having a ring gear R1 connected to the input gear 11, a second single pinion planetary gear unit G2, and a third single pinion planetary gear unit G3. The automatic transmission 10 is designed to produce six forward gear stages and one reverse gear stage (speed ratios). That is, in addition to the rear gear stage, the automatic transmission 10 is designed to produce first, second, third and fourth speed ratios or gear stages under a normal or underdrive mode as well as fifth and sixth speed ratios or gear stages under an overdrive mode. The various gear stages or speed ratios are produced by controlling the hydraulic pressure to the five hydraulically-actuated friction elements B1, B2, C1, C2, C3 which are engaged or disengaged by the hydraulic control device made up of the hydraulic pressure control portion 300 shown in FIG. 2.

The engaged and disengaged conditions of each of the hydraulically-actuated friction elements B1, B2, C1, C2, C3 to produce the desired gear stage are indicated in the following Table.

|  | C1 | C2 | C4 | B1 | B2 |
|---|---|---|---|---|---|
| 1st | o |  |  |  | o |
| 2nd | o |  |  | o |  |
| 3rd | o |  | o |  |  |
| 4th | o | o |  |  |  |
| 5th |  | o | o |  |  |
| 6th |  | o |  | o |  |
| Reverse |  |  | o |  | o | o: engaged condition;
blank: disengaged or released condition

Figure 2:
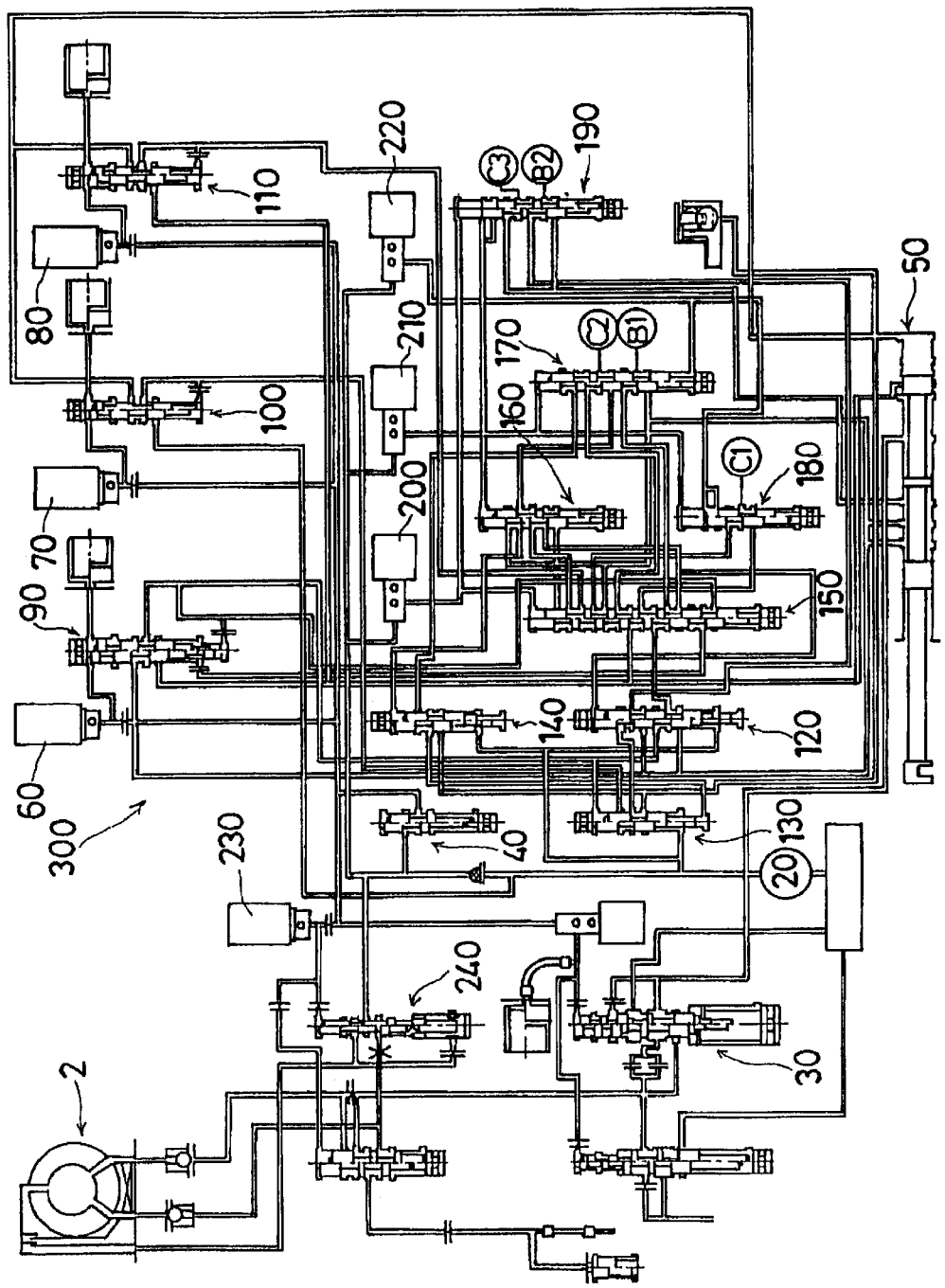
FIG. 2 is a hydraulic circuit diagram of the automatic transmission hydraulic control device in accordance with the present invention.
Figure 3:
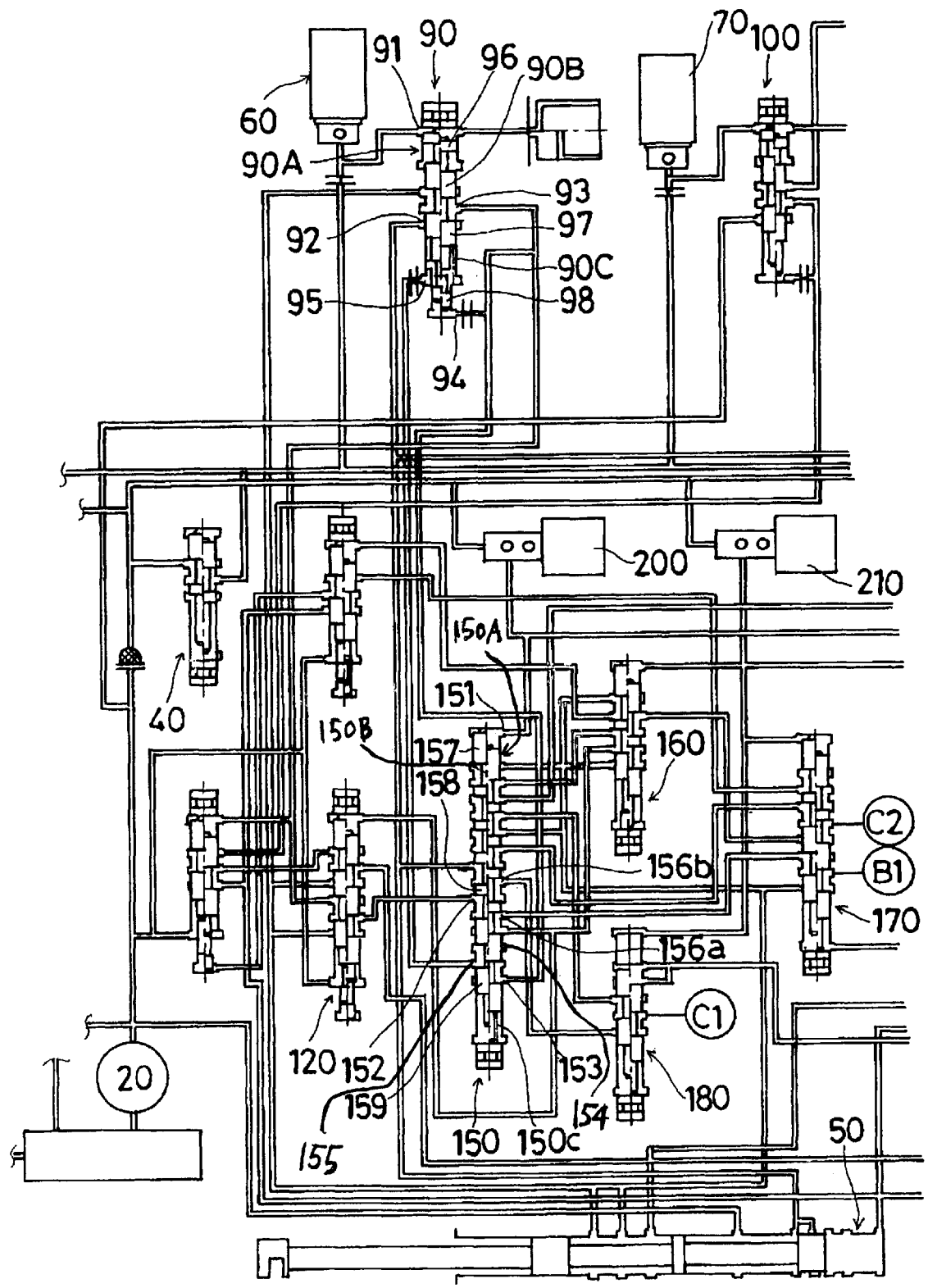
FIG. 3 illustrates in greater detail a portion of the hydraulic circuit diagram depicted in FIG. 2.

Referring to FIGS. 2 and 3, the hydraulic pressure control portion 300 includes an oil pump 20, a regulator valve 30 for generating a base pressure, a modulator valve 40 for reducing the base pressure, a manual valve 50 for switching or changing the gear range when operated manually, three linear solenoid valves 60, 70, 80 serving as adjusting mechanisms that each output an adjusted hydraulic pressure depending on the energized current supplied thereto by utilizing the hydraulic pressure from the oil pump 20 via the regulator valve 30, and control valves 90, 100, 110 that receive the adjusted pressures from the linear solenoid valves 60, 70, 80 respectively and generate a control pressure having a magnitude that depends on the received adjusted pressure. The hydraulic pressure control portion 300 also includes fail-safe valves 120, 130, 140 for preventing extra engagement of each of the friction elements by receiving the pressures outputted from the control valves 90, 100, 110, respectively, and five shift valves 150, 160, 170, 180, 190. Further, the hydraulic pressure control portion 300 includes three ON-OFF solenoid valves 200, 210, 220 for changing the positions of the shift valves 150, 160, 170, 180, 190.

In the illustrated embodiment, another linear solenoid valve 230 is provided in addition to the aforementioned three linear solenoid valves 60, 70, 80. This additional linear solenoid valve 230 is adapted to adjust a lock-up control valve 240 which serves for controlling the lock-up of the torque converter 2.

The energization of the linear solenoid valves 60, 70, 80 and the ON-OFF solenoid valves 200, 210, 220 is controlled by an electronic controller for producing a suitable gear stage and for establishing the best or most appropriate shift control based on the vehicle speed, the throttle opening, and the shift lever position.

The operation of the hydraulic pressure control device 300 proceeds as follows. The hydraulic pressure outputted from the oil pump 20 while the engine is operating or in rotation is adjusted at the regulator valve 30 to produce a base pressure. After being modulated or reduced at the modulator valve 40, the base pressure is applied to each of the linear solenoid valves 60, 70, 80. Depending upon the amount of energization of the linear solenoid valves 60, 70, 80, the linear solenoid valves 60, 70, 80 adjust the in-chamber pressure of the respective control valves 90, 100, 110. The control valves 90, 100 110 are also applied with the base pressure to adjust the control pressures which are outputted from the respective control valves 90, 100, 110. To prevent extra engagement in each of the friction elements, the control pressure outputted from each of the control valves 90, 100, 110 is applied to the shift valves 150, 160, 170, 180, 190 by way of the set of fail-safe valves 120, 130, 140. The control pressure applied to each of the shift valves 150, 160, 170, 180, 190 is then fed to the corresponding friction element to produce a desired gear stage. Energizing or deenergizing each of the ON-OFF solenoid valves 200, 210, 220 causes each of the shift valves 150, 160, 170, 180, 190 to change its position for switching the condition of the associated friction element(s) (i.e. for engaging the disengaged friction element or disengaging the engaged friction element).

In the illustrated and described version of the present invention, the control valve 90 solely applies control pressure to the friction brake B1 when the second gear stage is desired and to the friction clutch C1 when the fourth gear stage is desired. The control pressure required to engage the first brake B1 when producing the second gear stage is about 1000 kPa, whereas the control pressure required to engage the first clutch C1 when producing the fourth gear stage is about 200 kPa. This difference in the magnitude of the hydraulic pressure required to engage the friction element is mainly due to the gear train arrangement in the automatic transmission 10.

Describing in more detail the application of the control pressure from the control valve 90 to the friction brake (first friction element) B1 and to the friction clutch (second friction element) C1, the features associated with the control valve 90 will first be described. The control valve 90 includes a cylinder portion 90A, a valve main body 90B, and a coil spring 90C. The cylinder portion 90A has an adjusting pressure port 91 for receiving the adjusted pressure from the linear solenoid valve 60, a base pressure port 92 for receiving the base pressure by way of the manual valve 50, a control port 93 which is in fluid communication with the fail-safe valve 120, a first feedback port 94 which is in fluid communication with both the control port 93 and the shift valve 150, and a second feedback port 95 which is in fluid communication with the shift valve 150. The valve main body 90B has a third land 96 which is fitted in the cylinder portion 90A in a slidable fashion and which possesses a receiving area S3 for receiving the hydraulic pressure from the adjusting pressure port 91, a second land 97 which can adjust or interrupts the hydraulic pressure from the base pressure port 92 and which possesses a receiving area S2 for receiving the hydraulic pressure from the second feedback port 97, and a first land 98 which possesses a receiving area S1 for receiving the hydraulic pressure from the first feedback port 94. The coil spring 90C urges the valve main body 90B in the upward direction in FIG. 3.

The shift valve 150 includes a cylinder portion 150A, a valve main body 150B, and a coil spring 150C which urges the valve main body 150B in the upward direction in FIG. 3. The cylinder portion 150A has a switching port 151 for receiving the hydraulic pressure from the ON-OFF solenoid valve 200, a control pressure introduction port 152 which is in fluid communication with the fail-safe valve 120, a first control pressure adjusting port 153 which is in fluid communication with the first feedback port 94, a drain port 154 from which the hydraulic pressure is drained, a second control pressure adjusting port 155 which is in fluid communication with the second feedback port 95, a first shift port 156a which is in fluid communication with the shift valve 170, and a second shift port 156b which is in fluid communication with the shift valve 180.

The valve main body 150B has a first land 157 which is fitted in the cylinder portion 150A in a slidable fashion and which receives the hydraulic pressure from the switching port 151, a second land 158 which switches the hydraulic pressure from the control pressure introduction port 152 to either the first shift port 156a or the second shift port 156b, and a third land 159 which alternately communicates and interrupts fluid communication between the first control pressure adjusting port 153 and the second control pressure adjusting port 155 in such a manner that when fluid communication between the first control pressure adjusting port 153 and the second control pressure adjusting port 155 is permitted, the first control pressure adjusting port 153 and the second control pressure adjusting port 155 are interrupted from the drain port 154, whereas when fluid communication between the first control pressure adjusting port 153 and the second control pressure adjusting port 155 is interrupted, the second control pressure adjusting port 155 is brought into fluid communication with the drain port 154. The left side illustration of the shift valve 150 in FIG. 3 correspond to a first position of the shift valve 150 and the right side illustration of the shift valve 150 in FIG. 3 correspond to a second position of the shift valve 150.

Considering initially the hydraulic pressure application to the friction brake B1 when the second gear stage is to be produced, the valve main body 90B of the control valve 90 takes the right-side position shown in FIG. 3 by virtue of the adjusted hydraulic pressure outputted by the linear solenoid valve 60. Under such a condition, the base pressure port 92 which defines a slight clearance with the second land 97 is in fluid communication with the control port 93 and the base pressure is, after being throttled by the second land 97, fed from the base pressure port 92 to the control port 93. The control pressure outputted from the control port 93 is applied to the control pressure introduction port 152 of the shift valve 150 by way of the fail-safe valve 120. At this time, the ON-OFF solenoid valve 200 is deenergized and so the hydraulic pressure is not applied to the switching port 151, thereby positioning the shift valve 150 at the left-side position in FIG. 3. Thus, the hydraulic pressure received at the control pressure introduction port 152 of the shift valve 150 is fed to the shift valve 170 by way of the first shift port 156a. At this time, the ON-OFF solenoid valve 210 is deenergized, thereby positioning the shift valve 170 at the left-side position in FIG. 3. thus, the hydraulic pressure received at the shift valve 170 is fed to the friction brake B1 to effect engagement of the friction brake B1.

When the shift valve 150 is positioned at the left-side position in FIG. 3, the third land 159 interrupts fluid communication between the first control pressure adjusting port 153 and the second control pressure adjusting port 155, and permits fluid communication of the second control pressure adjusting port 155 with the drain port 154. As a result, control pressure is not applied to the second feedback port 95 of the control valve 90 though the control pressure is applied to the first control pressure adjusting port 153 of the shift valve 150. That is, the pressure adjustment in the control valve 90 depends on only the hydraulic pressure which is fed back to the first feedback port 94. Under the such a condition, the pressure balancing of the valve main body 90B in the control valve 90 is represented in the following manner.

$$PSOL \times S3 \; FSP + POUT \times S1$$

$$POUT = (PSOL \times S3 - FSP)/S1$$

where PSOL is the hydraulic pressure applied from the adjust port 91, POUT is the control pressure applied from the first feedback port 94, Fsp is the urging force of the coil spring 90C, S3 is the pressure receiving area of the third land 96, and S1 is the pressure receiving area of the first land 98.

The foregoing equation indicates that the control pressure POUT depends on the pressure receiving area S1 of the first land 98.

Turning now to the hydraulic pressure application to the friction clutch C1 when the fourth gear stage is to be produced, the pressure adjustment at the linear solenoid valve 60 and the control pressure output from the control port 93 are similar to those described above. The ON-OFF solenoid valve 200 is energized and so the shift valve 150 takes the right-side position in FIG. 3. Thus, the hydraulic pressure applied to the control pressure introduction port 152 is fed to the shift valve 180 by way of the second shift port 156b. At this time, the ON-OFF solenoid valve 210 is energized and the shift valve 180 takes the right-side position in FIG. 3. Thus, the hydraulic pressure applied to the shift valve 180 is thus applied to the friction clutch C1 to engage the friction clutch C1.

At this time, the control pressure which is outputted from the control valve 90 is applied to the first control pressure adjust port 153 of the shift valve 150 which is in fluid communication with the second control pressure adjust port 155. As a result, the control pressure is fed back to the valve main body 90B by way of the first feedback port 94 and the second feed back port 95. That is, the pressure adjustment of the control valve 90 is made by two feedback pressures; the feedback pressure at the first feedback port 94 and the feedback pressure at the second feedback port 95. Under this condition, the pressure balancing of the valve main body 90B in the control valve 90 is represented in the following manner.

$$PSOL \times S3 = FSP + POUT \times S1 + POUT \times (S2-S1)$$

$$PSOL \times S3 = FSP + POUT \times S2$$

$$POUT = (PSOL \times S3 - FSP)/S2$$

where PSOL is the hydraulic pressure applied from the adjust port 91, POUT is the control pressure applied from the first feedback port, Fsp is the urging force of the coil spring 90C, S3 is the pressure receiving area of the third land 96, S2 is the pressure receiving area of the second land 97, and S1 is the pressure receiving area of the first land 98.

The above equation indicates that the control pressure POUT depends on the pressure receiving area S2 of the second land 97. Thus, the control pressure applied to the friction clutch C1 when producing the fourth gear stage is S1/S2 times the control pressure applied to the friction brake B1 when producing the second gear stage. Thus, by way of example, the pressure receiving areas of the second land 97 and the first land 98 can be set as to be $S1/S2 = \frac{1}{5}$ so that the control pressure applied to the friction clutch C1 when producing the fourth gear stage is $\frac{1}{5}$ times the control pressure applied to the friction brake B1 when producing the second gear stage. Of course, this ratio can be varied depending upon the differences in pressure required to produce the relevant gear stages.

As is apparent from the foregoing description, in the disclosed and illustrated embodiment of the present invention, each of the shift valves 150, 160, 170 is switched to apply the required hydraulic pressure for engaging the friction clutch C1 having an adequate magnitude (200 kPa) when the hydraulic pressure is applied to the friction clutch C1 from the control valve 90 by way of the shift valves 150 and 170, and to apply the required hydraulic pressure for engaging the friction brake B1 having an adequate magnitude (1000 kPa) when the hydraulic pressure is applied to the brake B1 from the control valve 90 by way of the shift valves 150 and 160.

In this way, even if the hydraulic pressure required for engaging the first friction brake B1 (first friction element) significantly differs from the hydraulic pressure required for engaging the first friction clutch C1 (second friction element) in the hydraulic pressure control device 300 in which the control pressure is applied to either of the first friction element and the second friction element from the control valve 90 which is operated in a switching mode, an improved structure is employed which causes the shift valve 150 to communicate the control pressure feedback to the control valve 90 by way of both the first and second feedback ports 94, 95, or only the first feedback port 94. Thus, through use of one control valve, it is possible to selectively apply adequate control pressures to the two friction elements.

Consequently, it is possible to adequately balance the difference between the hydraulic pressures applied to the two respective friction elements, which results in an improvement in the hydraulic pressure control, thereby reducing shift shock and/or engine idling when the gear stage is changing. Thus, shift control performance is improved.

Thus, in accordance with the present invention, with a hydraulic pressure control device in which a single control valve selectively applies control pressure to plural friction elements, upon engagement of each of the friction elements, the applied control pressure is made adequate, resulting in improved hydraulic pressure control performance such as a reduction in shift shock and/or engine idling upon shift.

In addition, even if a specific friction element is applied with different magnitudes of control pressure at different gear stages, switching the shaft valve, if necessary, makes it possible to adequately apply the control pressure to the friction element to be engaged, thereby establishing preferable shift.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic pressure control device for an automatic transmission in which control pressure is applied to and drained from each of a plurality of friction elements, including a first friction element and a second friction element, to produce various gear stages, the hydraulic pressure control device comprising:

adjusting means for adjusting hydraulic pressure from an oil pump to produce an outputted hydraulic pressure;

a control valve receiving the outputted hydraulic pressure from the adjusting means for generating the control pressure to be applied to at least some of the friction elements whose magnitude depends on a magnitude of the outputted hydraulic pressure, the control valve including a control port from which the control pressure is outputted, a first feed back port to which the outputted control pressure is adapted to be fed back, and a second feed back port to which the outputted control pressure is adapted to be fed back;

a shift valve receiving the control pressure from the control valve and selectively positionable in a first position for applying hydraulic pressure to the first friction element and a second position for applying hydraulic pressure to the second friction element, the shift valve being operated in such a manner that fluid communication between the control port and each of the first and the second feedback ports is controlled to lower the control pressure from the control valve when the shift valve is in the second position relative to the control pressure from the control valve when the shift valve is in the first position; and switching means for switching the shift valve between the first position and the second position.

2. The hydraulic pressure control as set forth in claim 1, wherein the control port communicates with the first feedback port and is interrupted from communicating with the second feedback port when the shift valve is in the first position, and communicates with both the first and the second feedback ports when the shift valve is in the second position.

3. The hydraulic pressure control as set forth in claim 2, wherein the shift valve includes:

a cylinder portion having a first control pressure adjusting port which is in fluid communication with both the first feedback port and the control port, a second control pressure adjusting port which is in fluid communication with the second feedback port, a first shift port from which the hydraulic pressure is adapted to be fed to the first friction element, a second shift port from which the hydraulic pressure is adapted to be fed to the second friction element, and a control pressure introduction port to which the control pressure is adapted to be fed from the control valve;

a valve main body slidably fitted in the cylinder portion to interrupt fluid communication between the first and the second control pressure adjusting ports while also fluidly communicating the first shift port and the control pressure introduction port in the first position of the shift valve, and fluidly communicate the first and the second control pressure adjusting ports while also fluidly communicating the second shift port and the control pressure introduction port in the second position of the shift valve.

4. The hydraulic pressure control as set forth in claim 1, wherein the control valve includes:

a cylinder portion having the control port, the first feed back port, and the second feed back port;

a valve main body slidably fitted in the cylinder portion, and having a first land possessing a receiving area for receiving the hydraulic pressure from the first feedback port, and a second land possessing a receiving area for receiving the hydraulic pressure from the second feedback port;

the receiving area which receives the hydraulic pressure from the first feedback port being smaller than the receiving area which receives the hydraulic pressure from the second feedback port.

5. The hydraulic pressure control as set forth in claim 1, wherein the switching means is an ON-OFF solenoid valve.

6. The hydraulic pressure control as set forth in claim 1, wherein the adjusting means is a linear solenoid valve.

7. A hydraulic pressure control device for an automatic transmission in which control pressure is applied to and drained from a plurality of friction elements to produce various gear stages, comprising:

a linear solenoid valve connected to a pump to adjust hydraulic pressure from the pump and produce an outputted hydraulic pressure;

a control valve fluidly connected to the linear solenoid valve to receive the outputted hydraulic pressure from the linear solenoid valve and generate the control pressure to be applied to at least a first one of the friction elements and a second one of the friction elements, the control valve including a control port from which the control pressure is outputted, a first feed back port receiving control pressure and a second feed back port receiving control pressure;

a shift valve fluidly connected to the control valve to receive the control pressure from the control valve, said shift valve including a movable valve main body, a first shift port connected to the first friction element, a second shift port connected to the second friction element, and a control pressure adjusting port connected to the second feed back port of the control valve;

an ON-OFF solenoid valve connected to the shift valve to move the valve main body between a first position in which the hydraulic pressure is applied to the first friction element and is prevented from being applied to the second friction element and the control pressure is supplied to the first feed back port of the control valve while being prevented from being supplied to the second fee back port of the control valve, and a second position in which the hydraulic pressure is applied to the second friction element and is prevented from being applied to the first friction element and the control pressure is supplied to the second feed back control port of the control valve by way of the control pressure adjusting port and to the first feed back port of the control valve.

8. The hydraulic pressure control as set forth in claim 7, wherein the control pressure adjusting port is a second control pressure adjusting port, and wherein the shift valve includes a cylinder portion having a first control pressure adjusting port which is in fluid communication with both the first feedback port and the control port, the cylinder portion also including the second control pressure adjusting port and a control pressure introduction port to which the control pressure is adapted to be fed from the control valve.

9. The hydraulic pressure control as set forth in claim 8, wherein the control valve includes a cylinder portion having the control port, the first feed back port, and the second feed back port.

10. The hydraulic pressure control as set forth in claim 9, wherein the control valve also includes a valve main body slidably fitted in the cylinder portion of the control valve, the valve main body of the control valve having a first land possessing a receiving area for receiving the hydraulic pressure from the first feedback port, and a second land possessing a receiving area for receiving the hydraulic pressure from the second feedback port.

11. The hydraulic pressure control as set forth in claim 10, wherein the receiving area which receives the hydraulic pressure from the first feedback port is smaller than the receiving area which receives the hydraulic pressure from the second feedback port.

12. A method of controlling hydraulic pressure in an automatic transmission in which control pressure is applied to and drained from each of a plurality of friction elements to produce various gear stages, comprising:

producing one gear stage by supplying control pressure from a control valve to a first one of the friction elements by way of a shift valve while preventing control pressure from being supplied to a second one of the friction elements by way of the shift valve;

producing a different gear stage by supplying control pressure from the control valve to the second friction element by way of the shift valve while preventing control pressure from being supplied to the first friction element by way of the shift valve;

the control pressure supplied to the second friction element during the different gear stage being less than the control pressure supplied to the first friction element during the one gear stage; and wherein control pressure from the control valve is fed back to a first feed back port of the control valve as well as a second feed back control port of the control valve during the different gear stage.

13. The method according to claim 12, wherein the shift valve includes a movable valve main body, the valve main body being positioned at a first position to supply control pressure to the first friction element while preventing the supply of control pressure to the second friction element to produce the one gear stage, the valve main body being moved to a second position to supply control pressure to the second friction element while preventing the supply of control pressure to the first friction element to produce the different gear stage.

14. The method according to claim 12, wherein the control valve includes a valve main body that includes a first land having a receiving area and a second land having a receiving area that is smaller than the receiving area of the first land, and including supplying the control pressure to the receiving areas of both the first and second lands during the different gear stage, and supplying control pressure to the receiving area of the first land without supplying control pressure to the receiving area of the second land during the one gear stage.

15. The method according to claim 12, wherein control pressure from the control valve is fed back to the first feed back port of the control valve without being fed back to the second feed back control port of the control valve during the different gear stage.

* * * * *